United States Patent [19]

Langguth

[11] 4,068,396
[45] Jan. 17, 1978

[54] MACHINE FOR UPROOTING TREE STUMPS AND TREES

[76] Inventor: Harvard H. Langguth, 12111 Marlowe Drive, Garden Grove, Calif. 92641

[21] Appl. No.: 756,846

[22] Filed: Jan. 5, 1977

[51] Int. Cl.$^2$ ............................................. A01G 23/06
[52] U.S. Cl. .................................... 37/2 R; 83/928
[58] Field of Search .............. 37/2 R, 2 P; 144/34 R, 144/34 F; 83/928

[56] References Cited

U.S. PATENT DOCUMENTS

| 3,284,932 | 11/1966 | Wendlandt | 37/2 R |
| 3,594,931 | 7/1971 | Yost | 37/2 R |
| 3,717,944 | 2/1973 | Clegg | 37/2 R |
| 3,989,075 | 11/1976 | Coughran, Jr. | 37/2 R X |

Primary Examiner—E.H. Eickholt

[57] ABSTRACT

A machine for separating the roots of a tree from the earth in which they have taken hold and lifting the tree and attached roots for transportation to another location, sometimes termed a tree baller, so-called after the operation of wrapping the root structure in burlap to protect the same. In such condition the wrapping resembles a ball. The present disclosure pertains to improvements in such machines by the use of which the certain phases of the operation are rendered more expeditious and less costly to manufacture as compared with known, similar machines.

7 Claims, 9 Drawing Figures

MACHINE FOR UPROOTING TREE STUMPS AND TREES

BACKGROUND AND SUMMARY OF THE INVENTION

The invention employs a hollow, cylindrical drum, the lower edge of which carries a plurality of cutting blades, each pivoted on an individual vertical axis. The drum is split axially into two halves so that it may be opened to be placed in encircling relation with the tree trunk, closed, latched, and thereafter rotated. The cutting blades are freely pivoted at one end on the drum, extend inwardly thereof and, during rotation of the drum in a predetermined direction, are idle. However, upon reversal of rotation these blades are forced into a position whereat they occupy a radial position. At this stage the plug of soil is separated laterally from the surrounding soil by an annular trench. Upon reversal of the drum the cutting blades will embed themselves in the soil and cut a horizontal swath across the plug which, upon vertical translational movement of the drum, will lift the plug upwardly, Then, while the tree and roots are held suspended, the same may be wrapped in burlap to contain the soil and protect the root structure.

The lower edge of the drum carries one or more plow-like cutters to separate the "ball" of soil from the soil in which the tree grows in the manner aforesaid.

SUMMARY OF THE INVENTION

The present invention has reference to improvements in a machine of the class referred to for cutting the roots in advance of the descent of the drum, and which means includes features for forcing the cutting edges against the roots. Such means includes a plurality of pivotally-mounted blades having curved cutting edges, referred to herein as scyphiform. Optionally the blades may have a serrated edge. The blades are arranged as part of linkage whereby rotation of the drum combined with the tendency of the blades to embed themselves will draw the same centripetally against the root structure to sever the same.

The entire machine is arranged to be carried on a suitable mobile support, e.g. a crane formed as an element of a front end loader, whereby the machine may be lifted and transported from one job to the next.

DESCRIPTION OF THE PREFERRED EMBODIMENT

The machine is preferably arranged in such a way that it may be carried on a suitable vehicle as an accessory, e.g. the blade-supporting bar 10 of a front end loader from which the usual scraper blade may be detached and the invention machine installed in its place. Since the mechanism for raising and lowering the bulldozer blade is well-known, detailed description in deemed unnecessary.

Figure 3:
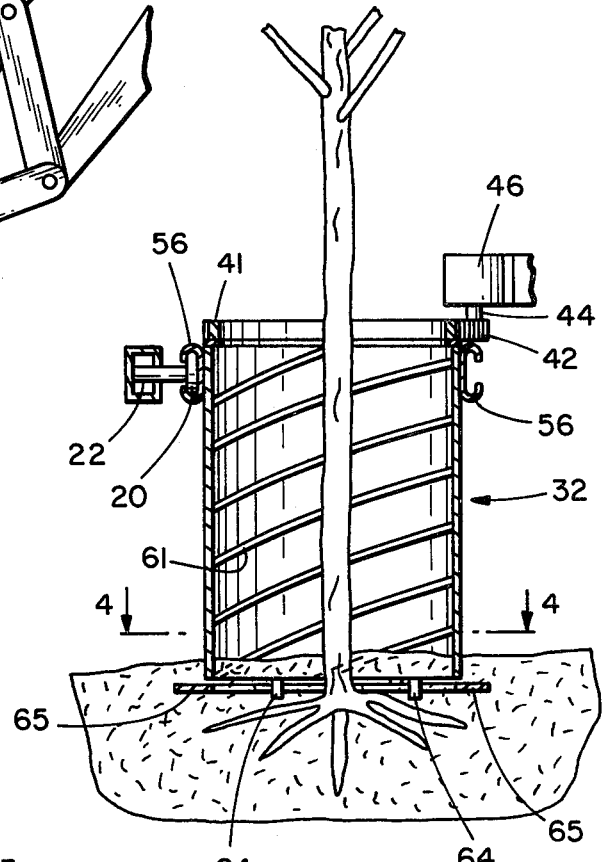
FIG. 3 is a cross section taken on the line 3—3 of FIG. 2.
Figure 2:
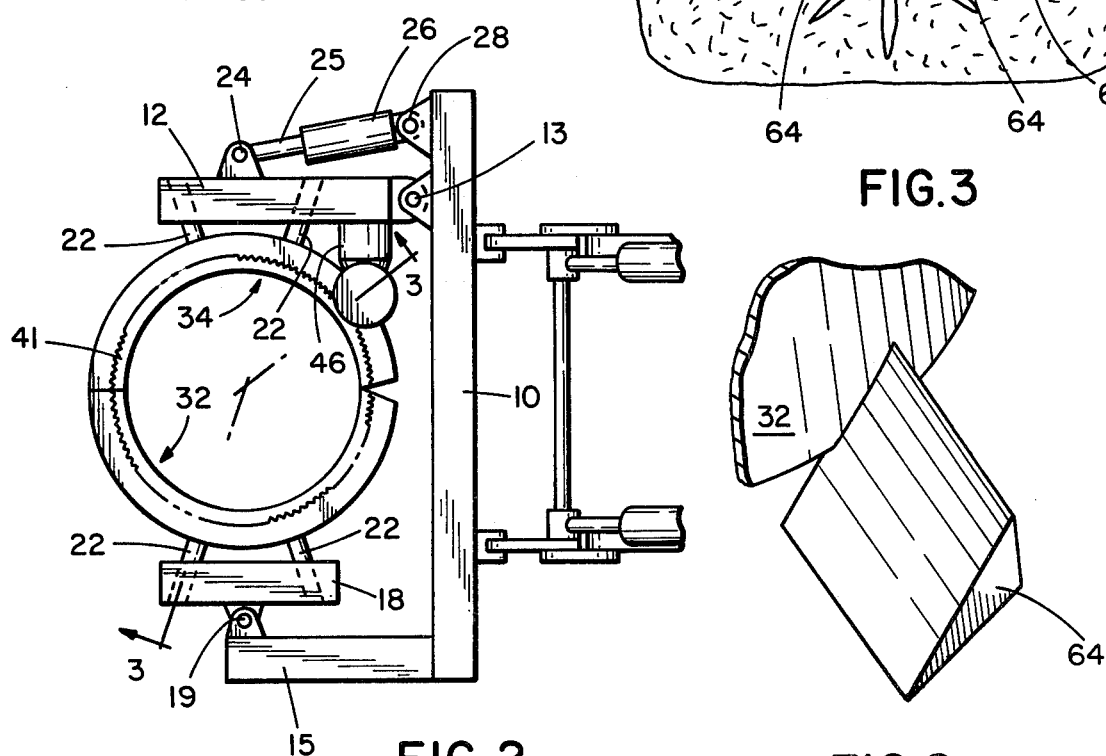
FIG. 2 is a top plan view of the same.

A forwardly extending arm 12 is pivoted at 13 to the bar 20 and another forwardly extending arm 15 is affixed to the bar 10. A bar 18 is pivoted at 19 to the arm 15. Each of the arm 12 and bar 18 is provided with a fixed stub shaft 22, each of which carries a wheel 20 (FIG. 3) upon which the boring and cutting mechanisms are suspended. The arm 12 is pivotally connected at 24 to the distal end of a piston 25 of a hydraulic cylinder 26 which is swivelled at 28 to the bar 10. Thus, inward actuation of the piston 26 by hydraulic pressure will open the two halves 32 and 34 of the drum as will be described. A description of the controlling valve and piping for the hydraulic cylinder and their operation will be omitted as being well-known.

The two halves 32 and 34 of the drum comprise semi-cylindrical shells of steel plate which, when brought together, form a circumferentially continuous, cylindrical shell of the desired diameter. At the top each half 32 or 34 is provided with a semi-circular ring gear segment 41 which is in mesh with a driving pinion 42 (FIG. 3) fixed on the output shaft 44 of a hydraulic motor 46. If desired as a safety factor, an inter-lock mechanism and valve (now shown) may be provided to interrupt oil feed to the motor 46 when the halves of the drum are not securely locked.

A hinge 51, e.g. a piano hinge, is connected between the halves 32 and 34 of the drum and one or more sets of ears 52—52 are provided diametrically opposite the hinge to receive a locking pin or pins (not shown) whereby the two halves may be locked together while the machine is in motion. Conveniently, these pins may be ring bolts.

A channel-shaped track section 56 (FIG. 3) is secured to the exterior of each drum half 32 and 34 whereby the drum, during its rotation, is reliably suspended on the wheel 20. To this end, it will be noted that the wheels 20 are a reasonably snug fit in the track sections 56.

The interior of the drum halves 32 and 34, considered together, is provided with helical ribs 61 arranged seriatim and each extending less than 360°. Thus the soil within the drum is pressed inwardly and compacted. This arrangement serves to reduce the friction between the interior of the drum and the soil therewithin. As will be seen later, the mass of soil and the roots entangled therein, may be lifted away when the bar 10 is raised. As a practical matter, it may be preferred to form the helix 61 of steel rod in order to facilitate bending thereof to confirm to the cylindrical surface of the drum and readily welded in place. The helix may be in continuous form, and then welded in place, whereafter the necessary gaps may be cut where the two halves 32 and 34 meet.

Figure 9:
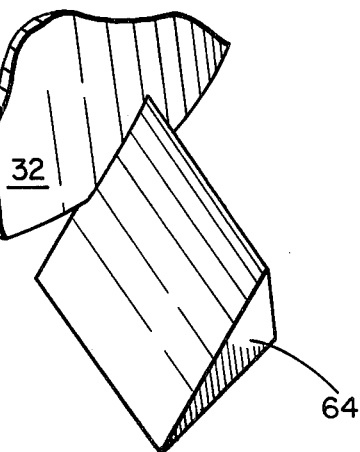
FIG. 9 is a detail in perspective of one of the plow-like elements to form the circular trench.

As the drum enters the soil, this latter is cut and loosened by means of a plurality of plow-like sharp bits 64 (FIGS. 1 and 9) mounted 90° to the face of the drum and with a cutting face at an angle of approximately 30° to 45° to the horizontal to cut an annular trench having a radial width corresponding to the path described by the blades. In this way a path is cleared to enable the drum to descend with minimum resistance.

Figure 4:
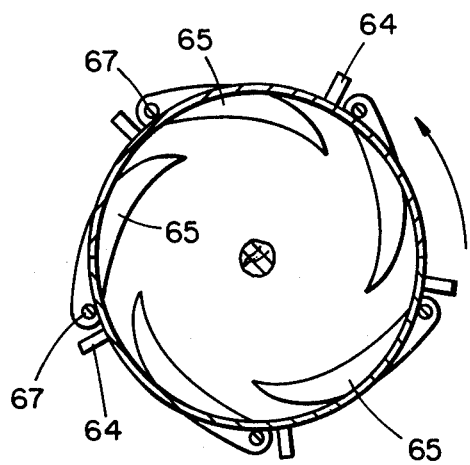
FIG. 4 is a cross section taken on the line 4—4 of FIG. 3.
Figure 5:
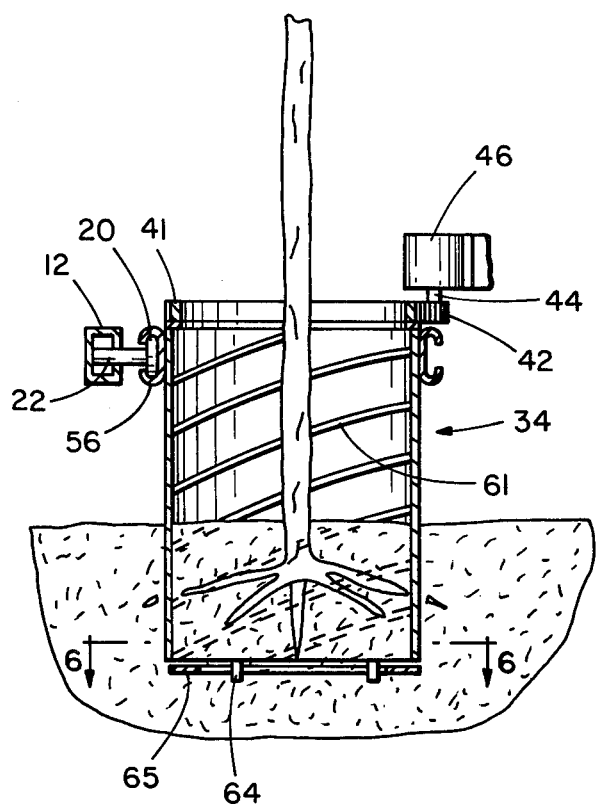
FIG. 5 is a cross section similar to FIG. 3 but showing the machine at about mid-way in its descent.
Figure 6:
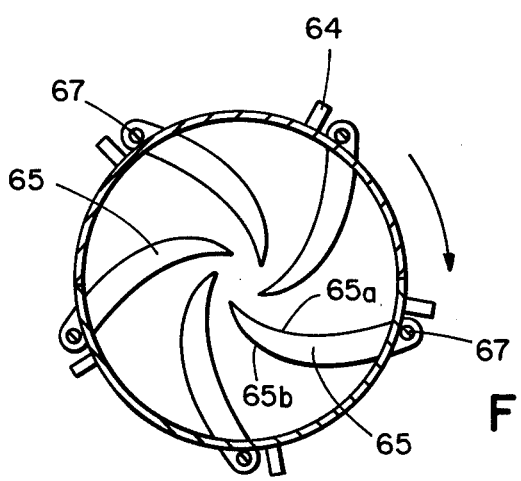
FIG. 6 is a view taken on the line 6—6 of FIG. 5.
Figure 7:
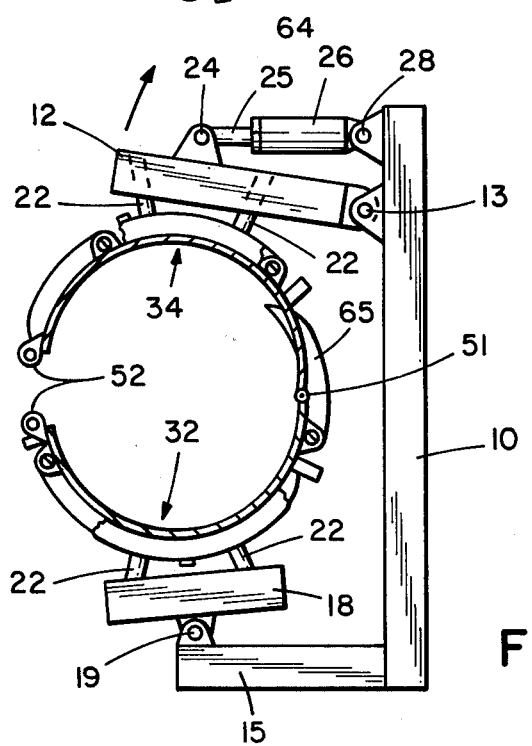
FIG. 7 is a top plan view of the machine showing the drum in partially open position.

In accordance with the present invention, cutting means, operating in a horizonal plane are provided to free the plug comprising soil and roots and to allow lifting the same with little or no hindrance. Thus, in addition to the shelllike cylindrical trench, there is provided a horizontal cut. Such means comprise a plurality, e.g., 5, scimitar-shaped blades 65 lying in a common, horizontal plane. If desired, additional blades may be stacked vertically to provide several plugs in the event a single plug is too heavy for convenient handling. The working edges 65a and 65b of the blades are desirably serrated to facilitate cutting of root but may be knife-edged or both serrated and knife-edged. When forced into retracted position, the blades are as shown in FIG. 7 and, when into active position toward the axis of the drum, are shown typically in FIG. 4. The extreme inward position may be seen in FIG. 6.

Figure 1:
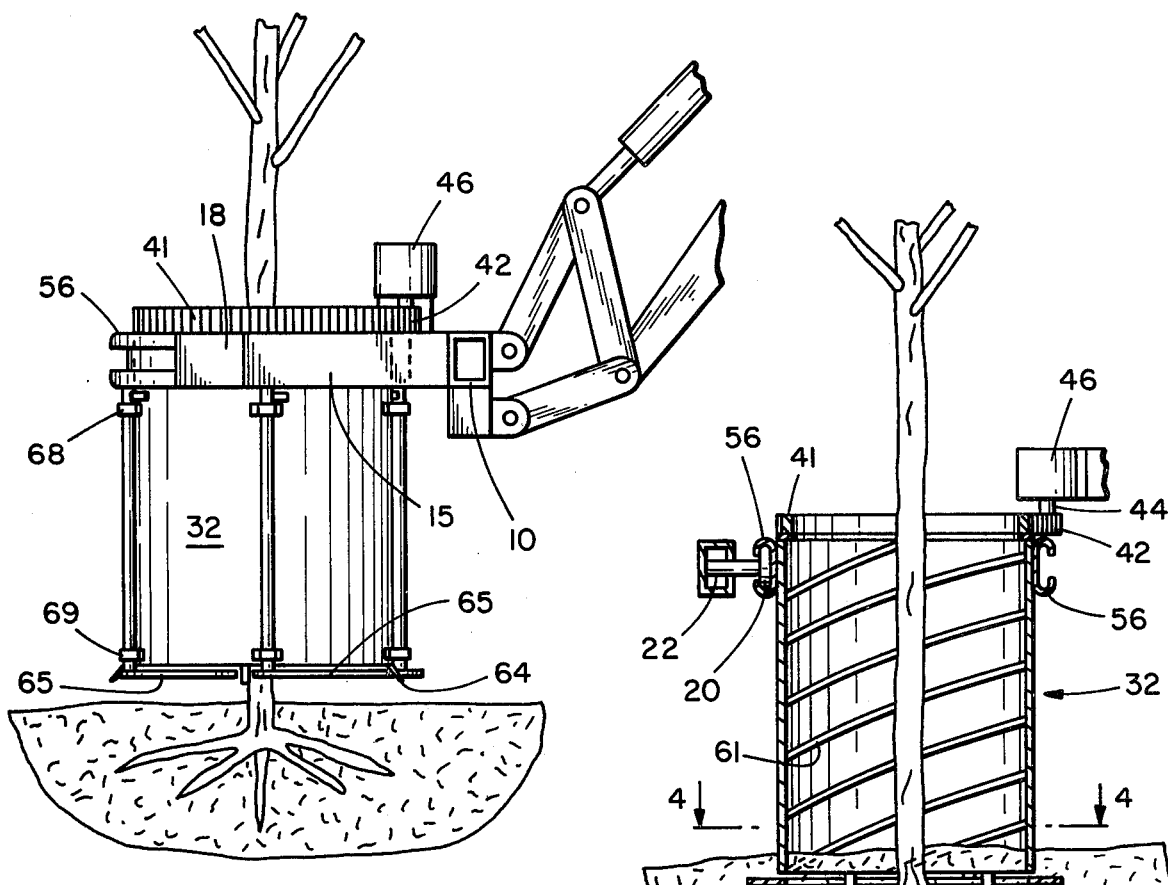
FIG. 1 is a side elevation of the machine suspended on a vehicle and in rest position.
Figure 8:
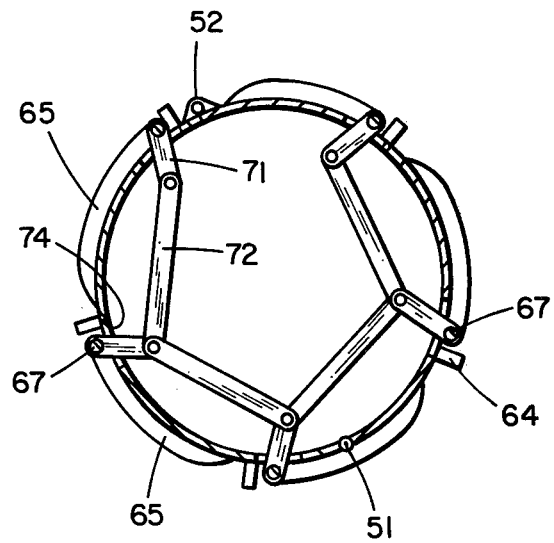
FIG. 8 is a bottom plan view of the linkage for operating the curved knives in their horizontal path.

Each blade 65 (FIG. 8) is keyed at its basal end to a vertical rod 67 rotatably supported in bearings 68 and 69 (FIG. 1). An arm 71 is secured to each of the rods 67 and the free end of each of these arms is attached to a link 72 in order that all of the blades 65 may be actuated in unison between their two limiting positions. Since, during its active phase, rotation of the drum is clockwise, each of the sharp leading portions of the blades 65 will be forced toward the axis of rotation (FIG. 6) with a stabbing movement and, in so doing, serve to cut the roots and soil. This action is assisted by the scimitar shape of the blades. Symmetry and balanced cutting action is achieved by the simultaneous action of all of the blades as synchronized by the linkage, best seen in FIG. 8. Moreover, the pattern formed by all of the blades (FIG. 6) is approximately equivalent to a floor extending horizontally across the mass of roots and soil so that, when the drum and its associated parts are withdrawn, the mass will be lifted clear of the work area for balling or other disposition.

It will be understood that both edges of the blades 65 are sharp in order that they may cut both on the radially inward, as on the radially outward, stroke so that the blades may be returned to outward position with little resistance in order to prepare for the succeeding cutting stroke or if a jam should necessitate deliberate reversal of the blades. Following the active stroke the blades will remain in their innermost position and thus will underlie the plug of soil and branches pending lifting and disposal; thereafter the blades may be returned to their outward position. By reason of the linkage connecting the blades for joint movement, operation of any blade will effect return of all.

Preferably a bit 64 is positioned just ahead of each blade 65 to reduce the effort required to drive the drum and the blades mounted thereon.

Furthermore, it will be seen that the drum is notched or slotted at 74, to allow the blades 65 to pivot without interference.

I claim:

1. In a tree-balling machine which comprises a cylindrical shell having means at one end to cut an annular trench in the soil, means supporting said shell for rotation and means to rotate said shell, the improvement which comprises a plurality of cutting blades, means pivotally mounting said blades on said shell for actuation as a group in a horizontal plane to cut a horizontal disc-like swath to define the ball composed of soil and roots, means to move said blades as a group between an outermost position and an innermost position, movement to innermost position occuring when the shell is rotated in one sense and movement to outermost position occurring when the shell is rotated in the opposite sense during rotation of the shell and means to raise the blades as a group to lift the ball and move the same to a point of delivery, means to move the blades as a group to release the ball and a linkage connecting all of the blades for synchronized movement.

2. The combination in accordance with claim 1 in which the blades are scyphiform, with the convex edge being the leading edge and both edges being serrate.

3. In a tree-balling machine which comprises a cylindrical shell having means at one end to cut an annular trench in the soil, means supporting said shell for rotation and means to rotate said shell, the improvement which comprises a plurality of cutting blades, means pivotally mounting said blades on said shell for actuation as a group in a horizontal plane to cut a swath to define the ball composed of soil and roots, means to move said blades as a group between an outermost position and an innermost position, movement to innermost position occurring when the shell is rotated in one sense and movement to outermost position occuring when the shell is rotated in the opposite sense during rotation of the shell to cut a horizontal disc-like swath to separate the plug from the adjacent mass of soil and roots, and means for actuating the blades as a group between said two positions comprising a linkage connecting all of the blades for synchronized movement, each blade being provided with an individual arm adapted to rotate the blade on its pivotal axis and a linkage connects all said arms for joint rotation in response to force applied to one of said arms.

4. In a tree-balling machine which comprises a cylindrical shell having means at one end to cut an annular trench in the soil, means supporting said shell for rotation and means to rotate said shell, the improvement which comprises a plurality of cutting blades, means pivotally mounting said blades on said shell for actuation as a group in a horizontal plane to cut a swath to define the ball composed of soil and roots, means to move said blades as a group between an outermost position and an innermost position, movement to innermost position occurring when the shell is rotated in one sense and movement to outermost position occurring when the shell is rotated in the opposite sense during rotation of the shell to cut a horizontal disc-like swath to separate the ball from the adjacent mass of soil and roots, a plurality of plow-like bits one individual to each blade and fixed to the lower edge of the shell, each of the plurality of bits being positioned in advance of its individual blade to reduce the load thereon during the cutting cycle.

5. In a tree-balling machine which comprises a cylindrical shell having means at one end to cut an annular trench in the soil, means supporting said shell for rotation and means to rotate said shell, the improvement which comprises a plurality of cutting blades, means pivotally mounting said blades on said shell for actuation as a group in a horizontal plane to cut a swath to define the ball composed of soil and roots, means to move said blades as a group between the outermost position and an innermost position, movement to innermost position occurring when the shell is rotated in one sense and movement to outermost position occurring when the shell is rotated in the opposite sense during rotation of the shell to cut a horizontal disc-like swath to separate the ball from the adjacent mass of soil and roots, a plurality of plow-like bits one individual to each blade and fixed to the lower edge of the shell, each of the plurality of bits being positioned in advance of said blade to reduce the load thereon during the cutting cycle, said bits being wedge-shaped with the crest thereof constituting a cutting edge positioned substantially radially of the shell and a face of each bit being inclined at an angle of about 30° to about 45° to the horizontal.

6. In a tree-balling machine which comprises a cylindrical shell having means at one end to cut an annular trench in the soil, means supporting said shell for rotation and means to rotate said shell, the improvement which comprises at least one helical element secured to the interior face of the shell to compact the soil adjacent said element as the trench is cut, whereby to reduce frictional forces acting between the shell and soil.

7. In a tree-balling machine which comprises a cylindrical shell having means at one end to cut an annular trench in the soil, means supporting said shell for rotation and means to rotate said shell, at least one helical element secured to the interior face of the shell to compact the soil interiorly of the shell as the trench is cut whereby to reduce frictional forces acting between the shell and soil, the shell comprising two semi-cylindrical parts hinged together to be opened to admit the tree before the start of cutting and to be opened at the conclusion of cutting, the helical element being interrupted to allow separation thereof when the shell parts are opened.

* * * * *